(12) United States Patent
Fascenda et al.

(10) Patent No.: US 6,304,746 B1
(45) Date of Patent: Oct. 16, 2001

(54) METHOD AND SYSTEM FOR PROVIDING FORMATTED INFORMATION VIA A TWO-WAY COMMUNICATIONS SYSTEM

(75) Inventors: Anthony C. Fascenda; Peter Kibler, both of Rockville, MD (US)

(73) Assignee: Aether Systems, Inc., DE (US)

( * ) Notice: Subject to any disclaimer, the term of this patent is extended or adjusted under 35 U.S.C. 154(b) by 0 days.

(21) Appl. No.: 09/195,482

(22) Filed: Nov. 17, 1998

(51) Int. Cl.[7] .................................................. H04Q 7/00
(52) U.S. Cl. .................. 455/31.3; 455/517; 340/825.26; 340/825.44
(58) Field of Search ................................ 455/31.3, 38.1, 455/517, 31.2, 426; 340/825.26, 825.27, 825.44

(56) References Cited

U.S. PATENT DOCUMENTS

| | | | |
|---|---|---|---|
| 3,387,268 | 6/1968 | Epstein | 340/154 |
| 4,473,824 | 9/1984 | Claytor | 340/825.57 |
| 4,677,434 | 6/1987 | Fascenda | 380/23 |
| 4,845,491 | 7/1989 | Fascenda et al. | 340/825.44 |
| 5,045,848 | 9/1991 | Fascenda | 340/825.26 |

(List continued on next page.)

FOREIGN PATENT DOCUMENTS

| | | | |
|---|---|---|---|
| 0 800 320 A2 | 10/1997 | (EP) | H04Q/7/22 |
| 0 800 320 A3 | 10/1997 | (EP) | H04Q/7/22 |
| WO 96/27985 A1 | 9/1996 | (WO) | H04N/7/088 |
| WO 97/08901 A2 | 3/1997 | (WO) . | |
| WO 97/08901 A3 | 3/1997 | (WO) . | |
| WO 98/21913 A2 | 5/1998 | (WO) | H04Q/7/38 |
| WO 98/21913 A3 | 5/1998 | (WO) | H04Q/7/38 |

OTHER PUBLICATIONS

"DocuPro: Products," from http://www.docupro.com/products.htm, Printed Jun. 12, 1998, pp. 1–2.

"Motorola's New FLEXsmart™ Pager with Organizer Features Combines Paging and Personal Information Manager Functions," from http://www.mot.com/MIMS/MSPG/Press/PR19980720_23438.html, Jul. 21, 1998, pp. 1–2.

"Motorola Smartpagers," from http://www.mot.com/MIMS/MSPG/SmartPagers/pw2k/pw2000_features–_specs.html, Copyright 1998, pp. 1–2.

Copy of International Search Report from PCT Appl. No. PCT/US99/26441, completed Mar. 8, 2000, 4 pages.

Primary Examiner—Nay Maung
Assistant Examiner—Quochien B. Vuong
(74) Attorney, Agent, or Firm—Wilmer Cutler & Pickering

(57) ABSTRACT

A method and system for providing formatted information via a wireless communications system that includes a plurality of cell sites. The method includes the steps of storing a plurality of page templates each having a page identifier and at least one information field. The method also includes the step of receiving a request from a first two-way wireless communications device, wherein the request specifies the first device and a first page identifier selected by a user of the first device. In response to receiving the request a first page template, of the plurality of page templates, is determined. The first page template corresponds to the first page identifier. The method also includes determining information relating to an information field of the first page template and sending a response message to the first device, wherein the response message includes the determined information. The method can includes the step of displaying the information on a display of the first paging device.

23 Claims, 9 Drawing Sheets

U.S. PATENT DOCUMENTS

| | | | |
|---|---|---|---|
| 5,241,305 | 8/1993 | Fascenda et al. | 340/825.44 |
| 5,345,227 | 9/1994 | Fascenda et al. | 340/825.22 |
| 5,398,021 | 3/1995 | Moore | 340/825.27 |
| 5,526,401 | 6/1996 | Roach, Jr. et al. | 379/59 |
| 5,539,395 | 7/1996 | Buss et al. | 340/827 |
| 5,555,446 * | 9/1996 | Jasinski | 455/31.3 |
| 5,594,945 | 1/1997 | Lewis et al. | 455/38.1 |
| 5,630,207 | 5/1997 | Gitlin et al. | 455/54.1 |
| 5,657,345 | 8/1997 | Lazaridis | 375/222 |
| 5,694,120 * | 12/1997 | Indekeu et al. | 455/38.1 |
| 5,705,995 * | 1/1998 | Laffin et al. | 340/825.26 |
| 5,729,827 * | 3/1998 | Wong et al. | 455/31.3 |
| 5,797,097 | 8/1998 | Roach, Jr. et al. | 455/456 |
| 5,809,415 * | 9/1998 | Rossmann | 455/31.3 |
| 5,936,547 * | 8/1999 | Lund | 455/31.3 |
| 6,060,997 * | 5/2000 | Taubenheim et al. | 340/825.44 |

* cited by examiner

| Mobile Access Number (MAN) | Cell Site |
|---|---|
| $MAN_1$ | 4 |
| $MAN_2$ | 22 |
| $MAN_3$ | 3 |
| $MAN_4$ | 13 |
| $MAN_5$ | N |
| ⋮ | ⋮ |
| $MAN_n$ | 54 |

FIG. 6

| Cell Site | Mobil Access Numbers (MANs) |
|---|---|
| 1 | $MAN_1, MAN_5$ |
| 2 | $MAN_8, MAN_{20}, MAN_3$ |
| 3 | $MAN_n$ |
| 4 | $MAN_{34}, MAN_6$ |
| 5 | $MAN_{52}, MAN_{67}$ |
| ⋮ | ⋮ |
| N | $MAN_2$ |

FIG. 7

| Page Identifier | MAN | Template |
|---|---|---|
| +FX | All MANs | Template+FX |
| +FUTURES | All MANs | Template+FUTURES |
| ... | ... | |
| +TONY1 | $MAN_4$ | Template+TONY1(4) |
| +TONY1 | $MAN_8$ | Template+TONY1(8) |
| +GROUP | $MAN_4, MAN_8, MAN_{12}, MAN_{33}$ | Template+GROUP(A) |
| +GROUP | $MAN_7, MAN_{22}, MAN_1, MAN_{50}$ | Template+GROUP(B) |

Symbol Entry
Enter Symbol: |_____:
Click wheel when done

900

FIG.9

METHOD AND SYSTEM FOR PROVIDING FORMATTED INFORMATION VIA A TWO-WAY COMMUNICATIONS SYSTEM

CROSS REFERENCED APPLICATION

The following application of common assignee contains some common disclosure, and is believed to have an effective filing date identical with that of the present invention: Method and System for Providing Localized Information, which is incorporated herein by reference in its entirety.

BACKGROUND OF THE INVENTION

1. Field of the Invention

The present invention relates generally to a wireless paging system, and more particularly, to an method and system for sending formatted information to a two-way communications device.

2. Related Art

Conventional wireless paging systems are typically one-way communication systems that can only send messages in a forward direction from a service provider to a subscriber's paging device. Because these one-way paging systems have no knowledge of the locations of paging devices, each message is distributed to all paging transmission facilities of a service provider, which can cover a geographic area such as North America. Each facility then transmits the message so that if an addressed paging device is within a coverage area of one of the transmitters, the message will be delivered to the paging device. This type of one-way paging system is often called a broadcast paging system. The message capacity of such a broadcast paging system is not used efficiently because each message is transmitted by every transmission facility in the system, but only one transmission facility will actually deliver the message to the subscriber's paging device. Therefore, the majority of the message traffic of any given transmitter will typically be occupied by messages addressed to pagers that are not within the coverage area of the transmitter. Accordingly, subscriptions to broadcast-type nationwide paging services are relatively expensive.

The messages sent in these one-way paging systems can be intended for one subscriber or for multiple subscribers. For example, a message intended for one subscriber's paging device can inform that subscriber that a third party is attempting to contact them. These paging devices are generally tuned to a predetermined frequency that is shared with many other paging devices. The reception of a particular message by a paging device activates an acoustic, vibrating, or visible alert, thereby indicating to the subscriber that a message has been received.

The addressability of a one-way paging device is determined by a unique identifier stored within the pager. The unique identifier may be considered analogous to a telephone number. For historical reasons, it is often referred to as a "capcode" because in early paging devices, a code number was printed on a cap that fit on top of the pager. The capcode is typically a four or seven digit number. This number is used by the paging system to generate the right sequence of tones to alert a specific paging device. In other words, the capcode is the unique serial number that paging system transmitters transmit to notify a paging device of an incoming message.

Examples of one-way paging messages intended for multiple subscribers include headline news, sports scores, and financial information. More specifically, companies such as Mobeo, Inc. (formerly DocuPro, Inc.) of Bethesda, Md., provide real-time quotes of financial instruments, energy instruments, world metal markets, and late-breaking news. A subscriber of Mobeo can receive such message information using a one-way paging device such as the ADVISOR™ Gold pager manufactured by Motorola, Inc. of Schaumburg, Ill. The same message information is broadcast by every transmission facility of the wireless data network supporting Mobeo. As discussed above, the addressability of a one-way paging device is determined by its capcode. These capcodes can be reprogrammed such that multiple paging devices have the same capcode. Thus, when multiple paging devices are programmed to have same capcode, each paging device can receive the message information broadcast by the transmitters.

A further disadvantage of these one-way paging systems is that the message information sent to the multiple subscribers is not tailored to the interests of each subscriber. Rather the message information is generally created to appeal to a broad spectrum of subscribers regardless of their individual interests and/or needs. For example, if individuals subscribe to a nationwide sports paging service, the message information can include the final results of the current day's baseball games because this type of information would probably appeal to a broad spectrum of subscribers. However, since the performance of a Baltimore Orioles' player is probably not of interest to a subscriber located in Seattle, such information cannot be economically provided to a Baltimore subscriber. That is, it would be a very inefficient use of valuable airtime for a service provider to transmit information relating to a Baltimore player from every transmission facility in a nationwide system. More generally, it is not efficient to send an information to the entire coverage area of a nation wide paging service where the information is only of interest to subscribers in one specific geographic area.

Still another disadvantage of these one-way paging systems is that subscribers pay the same amount for a service whether they desire information only once a day or fifty time a day. This may cause a service provider to lose revenue from customers that want only minimal information and are thus unwilling to pay for full service. Accordingly, it would be beneficial for a service provider to charge relative to the extent of a subscriber's use of service.

Attempts have been made to overcome some of the above disadvantages. For example, limited two-way wireless communications have been added to paging systems that were designed to handle one-way paging. For example, Motorola has developed the ReFLEX™ Protocol for two-way paging. A primary use of ReFLEX is to enable a paging device to send an acknowledgment (ACK) message indicating that a message has been received. This increases the reliability of a paging system because a message can be resent until an ACK message has been received. However, since ReFLEX was designed to modify an existing one-way FLEX™ protocol, its two-way capabilities are somewhat limited. For example, for messages originating at a paging device, ReFLEX support data rates of only 800, 1600, 6400, or 9600 bits per second (bps). Additionally, it typically takes on the order of a few minutes, from the time a message is sent to a paging device, to receive an ACK message using ReFLEX. Accordingly, ReFLEX has not satisfactorily overcome most of the above discussed disadvantages. More generally, ReFLEX has not proved acceptable for real time two-way communications.

More robust two-way wireless paging systems include the BellSouth Wireless Data network (also known as the RAM Mobile Data network) and the ARDIS network. These networks provide two-way paging using paging devices such as the Inter@active Pager™ manufactured by Research In Motion (RIM), Limited, of Waterloo, Ontario, Canada. This RIM two-way pager provides fast two-way delivery of full-length, error-free, alphanumeric messages with guaranteed delivery. For example, when using the RIM pager with the BellSouth Wireless Data network or the ARDIS network, an acknowledgment message is received within a few seconds of the original message being sent. Thus, such networks and paging devices are beginning to provide two-way wireless paging services that have not previously been available.

Additional details of the BellSouth and ARDIS networks are publically available. For example, U.S. Pat. No. 5,526,401, entitled "Method and Apparatus for Acknowledging A Paging Message Via A Cellular Network Control Channel", and U.S. Pat. No. 5,797,097, entitled "Method and Apparatus for Identifying the Location of a Roaming Pager", both of which are assigned to BellSouth Corporation, of Atlanta, Ga., and both of which are incorporated herein by reference, provide additional details of the BellSouth network.

Two-way paging devices are addressed through the use of unique identifiers. Some identifiers are programmable and others are hard coded and fixed in a paging device. A programmable and/or hard coded identifier can be used to address a specific paging device. Because two-way paging devices transmit messages that include these unique identifiers, fraud is more likely to be detected.

There is a need to overcome the above discussed disadvantages. More specifically there is a need to cost effectively and efficiently provide subscribers with information specific to their needs and/or desires when the subscribers need and/or desire such information. Further, there is a need to provide subscribers with information that has a logical and useful format. Additionally, there is a need to provide a subscriber with information that is specifically formatted for that individual subscriber. Also, there is a need to efficiently request and receive complex sets of information (for example, financial information) using a minimum amount of airtime.

SUMMARY OF THE INVENTION

The present invention is directed toward a method and system for providing formatted information via a wireless communications system that includes a plurality of cell sites. The method includes the step of storing a plurality of page templates each having a page identifier and at least one information field. The method also includes the step of receiving a request from a first two-way wireless communications device, wherein the request specifies the first device and a first page identifier selected by a user of the first device. A first page template, of the plurality of page templates, is determined in response to receiving the request. The first page template corresponds to the first page identifier. The method also includes determining information relating to an information field of the first page template and sending a response message to the first device, wherein the response message includes the determined information. The information can then be displayed on a display of the first device.

A portfolio list, including at least the first page identifier, can be displayed on the first device. The user of the first paging device can select a page identifier from this portfolio list. In one embodiment, the portfolio list can be displayed in response to a portfolio key of the first paging device being pressed, regardless of what was displayed on the first paging device prior to the portfolio key being pressed.

Each of the plurality of stored templates can also corresponds to a two-way wireless communications device. Accordingly, a first page template corresponding to both the first page identifier and the first device can be different than a further page template corresponding to the first page identifier and a second device.

The request can specify a brief page identifier corresponding to the first page identifier to thereby reduce airtime used when sending the request from the first device to a receiver of a cell site.

BRIEF DESCRIPTION OF THE FIGURES

The features, objects, and advantages of the present invention will become more apparent from the detailed description set forth below when taken in conjunction with the drawings in which like reference characters identify corresponding elements throughout and wherein:

FIGS. 6A, 6B and 7 illustrate tables that map cell sites with unique identifiers of paging devices;

FIG. 8 illustrates a table that maps page identifiers, unique identifiers, and templates, according to an embodiment of the present invention;

FIG. 9 shows an exemplary "Symbol Entry screen" according to an embodiment of the present invention.

DETAILED DESCRIPTION OF THE PREFERRED EMBODIMENTS

I. Introduction

The present invention is particularly suited for use in two-way wireless communications systems. The method and system of the present invention supports the efficient transmission of formatted information to two-way communications devices upon receiving a request for such information from the device.

A preferred embodiment of the invention is discussed in detail below. While specific steps, configurations and arrangements are discussed, it should be understood that this is done for illustrative purposes only.

II. Exemplary Two-Way Wireless Communications System

Figure 1:
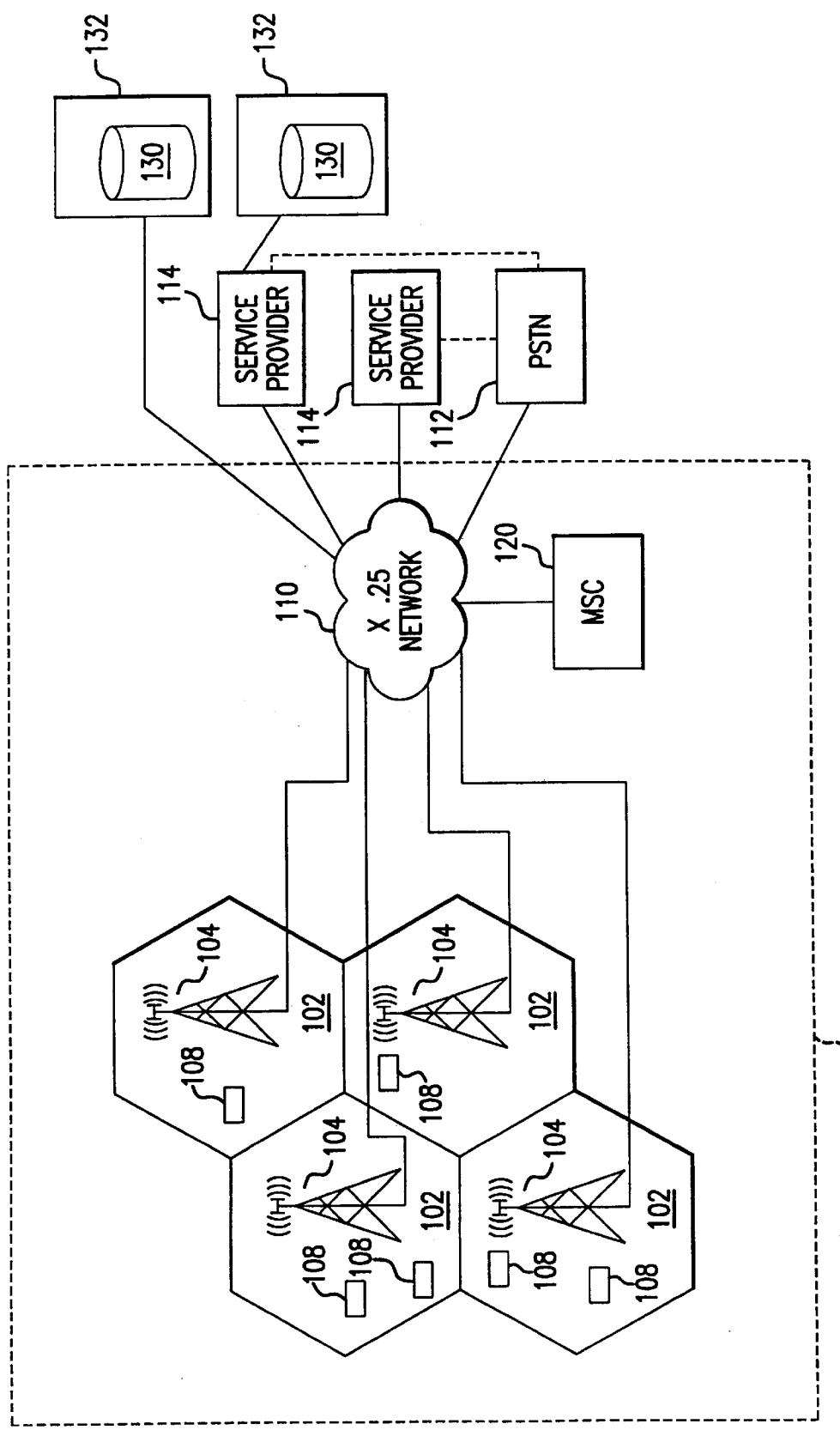
FIG. 1 illustrates an exemplary wireless communication system in which the present invention is useful.

An exemplary wireless communication system 100 in which the present invention is useful is illustrated in FIG. 1. Communications system 100 includes a plurality of cell sites 102 each having a coverage area that is typically about 5 to 10 miles in diameter. A coverage area of one cell site often overlaps a portion of a coverage area of a second cell site, which are illustrated for exemplary purposes by the hexagonal regions. Each cell site 102 includes an antenna 104 for transmitting and receiving paging messages to and from two-way wireless paging devices 108 that are located within a geographic coverage area of the cell site 102. Alternatively, separate antennas can be used for sending and receiving messages, as would be apparent to a person skilled in the relevant art. Each cell 102 is coupled to communications network 110, which in a preferred embodiment is an X.25 packet switched network. Communications network 110 may include, but is not limited to, land based links such as fiber optics or terrestrial microwave, and/or satellite based links, as would also be apparent to a person skilled in the relevant art.

Each cell site 102 is in communications with a message system center (MSC) 120 that includes a subscriber database that maintains records of all subscribers on the system, a unique identity sequence for the subscriber's paging device, and an indication of the cell site from which a paging device last sent a message (such as an acknowledgment message). Preferably, communications between each cell cite 102 and MSC 120 is accomplished through communications network 110. Alternatively, each cell site 102 can have a dedicated link to MSC 120.

Communications network 110 can be coupled to public switched telephone network (PSTN) 112 so that a caller can use PSTN 112 to send a message to paging device 108, and vice versa.

A message can also be sent from one paging device 108 to another paging device 108 using communications system 100.

Messages transmitted to paging device 108 from antenna 104 of cell site 102 shall be referred to herein as forward channel messages or pages. Messages originating at paging device 108 and received by antenna 104 of cell site 102 shall be referred to herein as reverse channel messages.

In a preferred embodiment, communications system 100 is the Bell South Wireless Data network (also known as the RAM Mobile Data network) or the ARDIS network, which are both well known two-way nationwide wireless packet data networks.

Two-way wireless communications device 108 (also referred to herein as a paging device) typically identifies itself to MSC 120 by sending a registration or identification signal. Such signals include a data field including at least a unique identification identifier, such as a Mobile Identification Number (MIN) and/or Electronic Serial Number (ESN). A MIN, which can be reprogrammed, is analogous to a telephone number. An ESN is hard-coded and fixed such that it supposedly cannot be changed. Some paging devices include both a MIN and an ESN. The paging device used in the preferred embodiment of the present invention, discussed in more detail below, only includes one unique sequence, known as a Mobile Access Number (MAN), which is similar to an ESN in that it is hard-coded and fixed. The identification signal sent by paging device 108 can include one or more of the above discussed unique identifiers. Such identification information can be periodically transmitted by paging device 108 and/or included with other types of messages sent by paging device 108.

An optional function of MSC 120 is to determine whether the unique identifier of a paging device is valid. A received unique identifier, such as a string of digitally represented alphanumeric characters, can be compared to a database maintained of unique identifiers (i.e., MIN, ESN, MAN) to detect fraud.

MSC 120 can keep track of the approximate whereabouts of each paging device 108 by keeping track of which cell site 102 a message, sent by a paging device 108, originated. When MSC 120 is thus informed of the approximate whereabouts of each individual paging device 108, it can later limit the number of cell sites 102 from which it transmits a message addressed to a particular paging device 108. MSC 120 can even limit the transmission of a message to only one cell site, the cell site whose coverage area the particular paging device 108 is believed to be located within. The coverage area of the limited number of cell cites 102 (possibly only a single cell site or a last known site and its adjacent sites) shall be referred to as a targeted coverage area. Thus, the targeted area can be the area covered by a single cell site or a slightly larger area that is covered by a few cell sites. This limited or "targetted paging" is much more efficient than broadcast-type paging where a message is transmitted from every cell site, regardless of a location of the paging device 108 to which the message is addressed.

Service providers 114 are supported by communications system 100. That is, communications system 100 provides for message delivery between a service provider 114 and one or more paging devices 108. Service providers 114 can communicate directly with communications network 110. Alternatively, service providers 114 can communicate with communications network 110 through PSTN 112. In one embodiment, service providers 114 provide information to a paging device 108 upon receiving a request from the paging device 108. Additionally, service providers 114 can initiate the sending of information to a paging device 108. This can be done periodically or upon a triggering event. Additional details about the types of services and the information provided by services providers 114 are discussed below.

Service providers 114 maintain or otherwise have access to local or remote databases which store and/or provide various types of data. FIG. 1 shows remote databases 130 that are maintained by data sources 132. Service provider 114 can communicate with data sources 132 through dedicated links or through communications network 110, for example. The type and number of databases, and the form of communication of data between the service providers 114 and the databases, is implementation specific.

The invention covers the ability of a service provider system to provide formatted information to paging devices (i.e., uniquely identifiable two-way wireless communications devices) via a wireless communications system, which typically has a plurality of cell sites that are coupled to a communications network. The functions performed by the service provider system can comprise software running on one or more general purpose computers or on telecommunications-specific hardware. Alternatively, the combination of the software and hardware to accomplish the functions of the present invention can be conceptualized as a union of service provider controllers that each perform a discrete task, such as: storing a plurality of page templates each having a page identifier and at least one information field; receiving a request from a first two-way wireless communications device, the request specifying the first device and a first page identifier selected by a user of the first device; determining a first page template of the plurality of page templates that corresponds to the first page identifier; determining information relating to an information field of the first page template; and sending a response message to the first device, the response message including the determined information. Two or more of these discrete tasks can be performed by a single service provider controller. Alternatively, discrete tasks can be performed by any number of service provider controllers. A further description of exemplary software and hardware controllers is provided below.

III. Exemplary Two-Way Paging Device

Figure 2A:
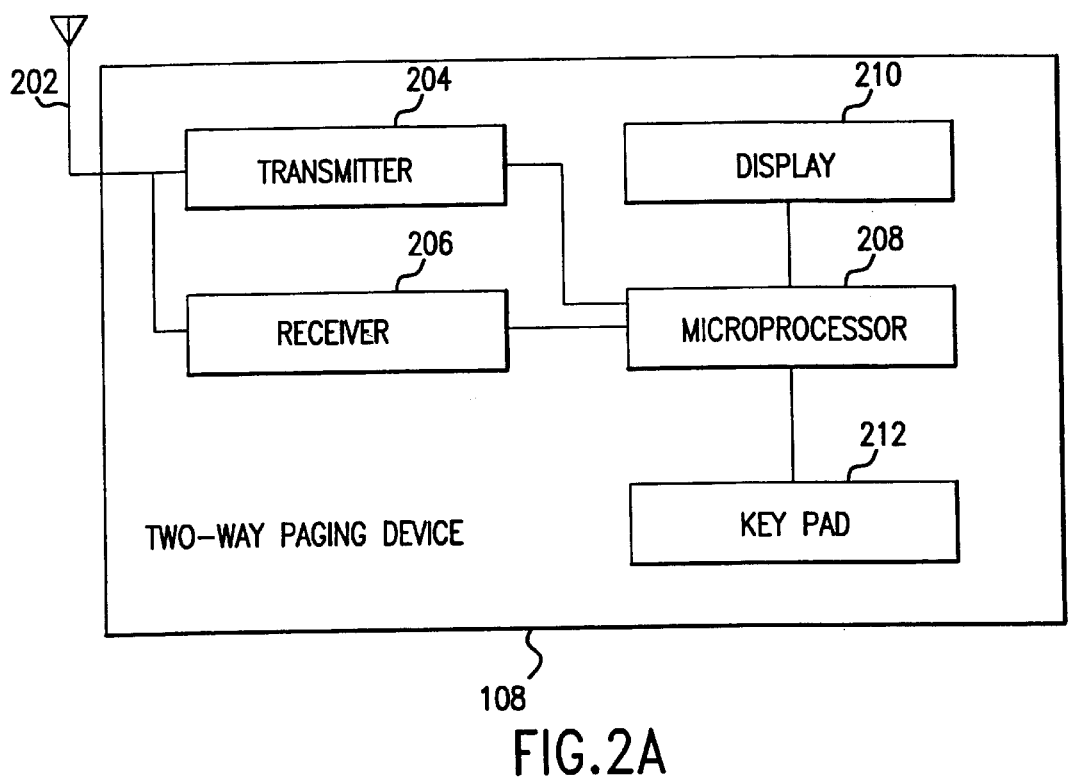
FIGS. 2A and 2B illustrate exemplary two-way paging devices for use with the present invention.

An exemplary two-way wireless paging device is illustrated in FIG. 2A. Paging device 108 includes antenna 202, transmitter 204, receiver 206, microprocessor 208, display 210 and keypad 212. Transmitter 204 is controlled by microprocessor 208 to transmit through antenna 202 reverse channel messages. Forward channel messages received from a transmitter of the paging system are received through antenna 202 or a separate antenna (not shown). The received messages are routed from antenna 202 to receiver 206 and processed by microprocessor 208, for example. Display 210 can be a liquid crystal display and is used for displaying, to a user (also referred to as subscriber) of paging device 108, information received via communications system 100. Display 210 can also display lists and/or menus from which a subscriber can make selections and perform various functions. Other methods of presenting the received information, such as aurally through a speaker or through another type of display, are not precluded. Keypad 212 can include as few as one button, but can also include an entire alphanumeric keypad.

Figure 2B:
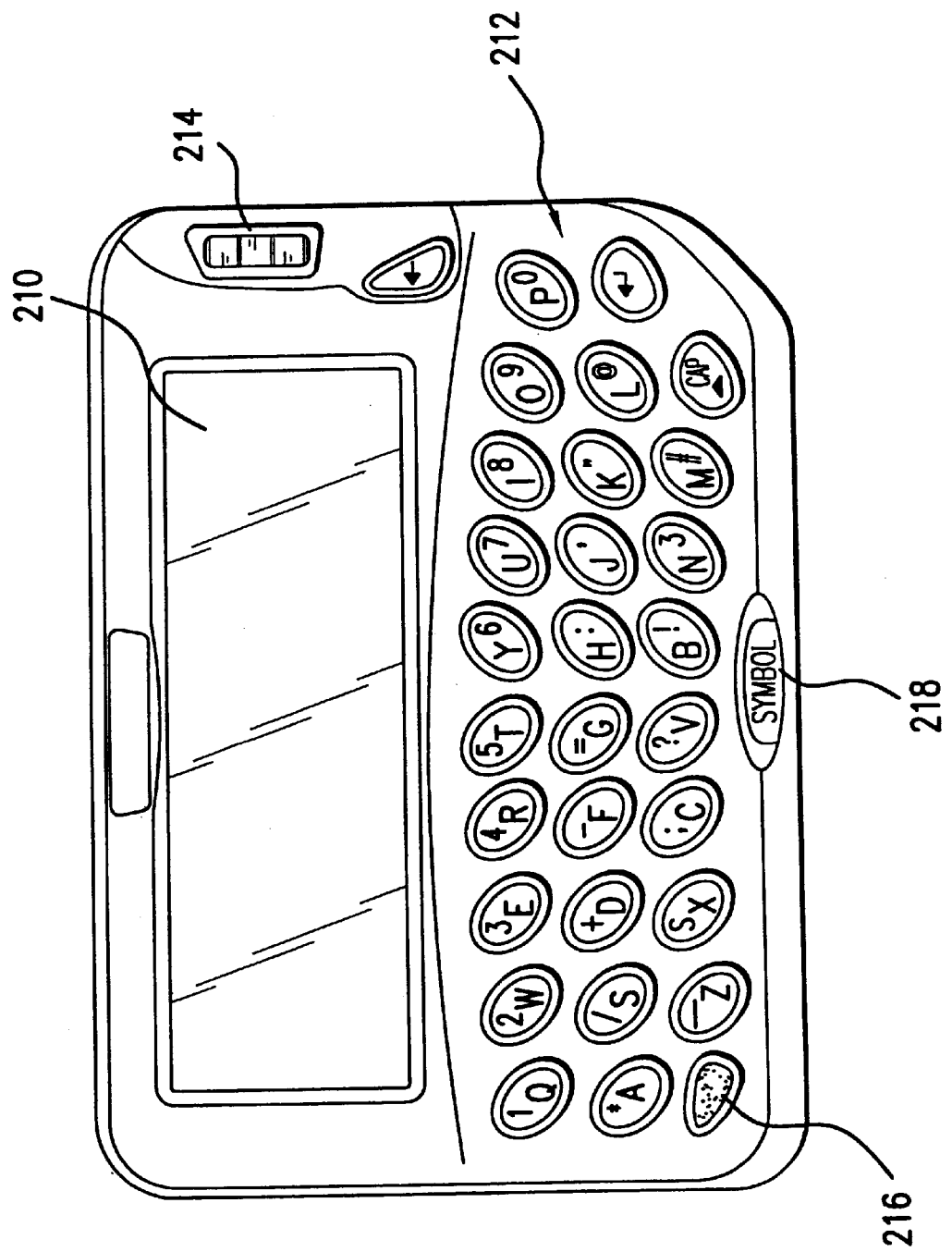

In a preferred embodiment, paging device 108 is an Inter@ctive™ Pager 950 manufactured by Research In Motion (RIM), Limited, of Waterloo, Ontario, Canada. The RIM Inter@ctive pager (RIM pager) is a commercially available device that provides two-way wireless communications. The RIM pager, shown in FIG. 2B, includes a 31-key keypad 212, roller wheel 214 that is similar to a mouse, and screen display 210 with 8 lines of text by approximately 28 characters per line. The RIM page also includes a built-in internal radio modem for two-way wireless communications over a cellular network such as the BellSouth network. Of course, the use of other two-way cellular paging devices is within the spirit and scope of the present invention.

Paging device 108 can also includes memory elements (not shown). For example, the RIM pager includes 1 Mbytes of flash memory and 304 Kbytes of static random access memory (SRAM). Computer programs (also called computer control logic) can be stored in these memory elements. Such computer programs, when executed, enable paging device 108 to perform some of the features of the present invention as discussed herein. In particular, the computer programs, when executed, enable microprocessor 208 to perform specific features of the present invention.

In an embodiment where features of the invention are implemented using software, the software can be stored in a computer program product and loaded into the memory of paging device 108 using, for example, a communications interface. For example, the RIM pager includes an RS-232 compatible serial port. The control logic (software), when executed by microprocessor 208 causes microprocessor 208 to perform certain functions of the invention as described herein.

IV. Preferred Embodiment of the Invention

A. Portfolio Lists

Figure 3:
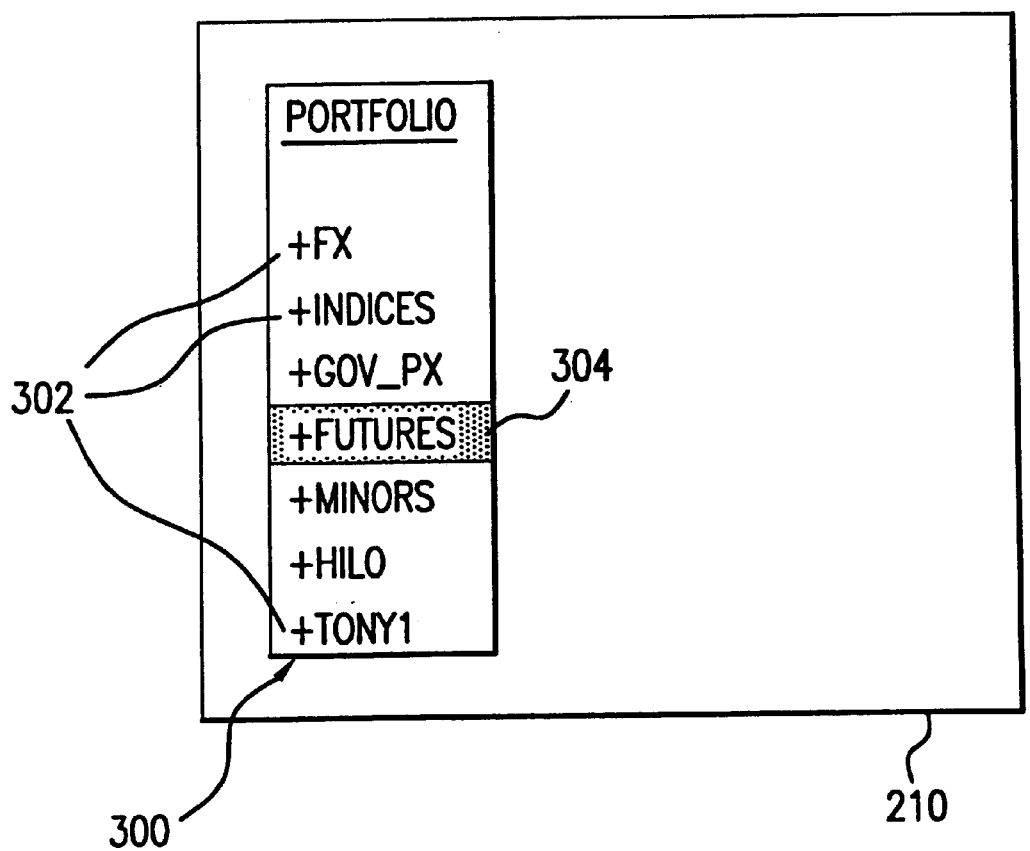
FIG. 3 shows a portfolio list presented on a display screen of a paging device, according to an embodiment of the present invention.

A main feature of the present invention is to provide two-way pager subscribers with a list of formatted information that they can request. In order to achieve this aspect of the present invention, such a list can be displayed on display 210 of paging device 108. FIG. 3 shows a portfolio list 300 that is presented on display 210 of paging device 108. In a preferred embodiment, portfolio list 300 is maintained within a memory (not shown) of paging device 108. Additionally, in a preferred embodiment, discussed in more detail below, a user can press a "portfolio" button to have portfolio list 300 presented on display 210, regardless of what was previously presented on display 210.

Portfolio list 300 is made up of page identifiers 302. The exemplary portfolio list 300, shown in FIG. 3, includes page identifiers +FX, +INDICES, +GOV_PX, +FUTURES, +MINORS, +HILO and +TONY1.

A user can scroll through and select any individual page identifier 302 of portfolio list 300 using an input mechanism, such as keypad 212, of paging device 108. In a preferred embodiment, where paging device 108 is RIM pager discussed above, a user can scroll through portfolio list 300 using the thumb wheel 214. More specifically, the user can roll or turn thumb wheel 214 until a desired one of the page identifiers 302 is highlighted, as shown generally by the shading of the page identifier "+FUTURES." The user can then press the thumb wheel to select the highlighted page identifier 302. The use of other types of input mechanisms to scroll through portfolio list 300 and select a page identifier 302, such as up/down arrows, shift keys, return keys, and the like, are within the spirit and scope of the present invention. Other types of indications besides highlighting, such as pointing with arrows or bolding, can be used to indicate which page identifier 302 is to be selected.

Paging device 108 can store one or more portfolio lists 300. Each list can be related to a particular topic. For example, the portfolio list 300 shown in FIG. 3 relates to financial information. Another portfolio list 300 (not shown) can relate to sports, wherein the page identifiers can include +YANKEES, +METS, +DODGERS, and the like. A user can move from one portfolio list 300 to another using an input mechanism of paging device 108.

Each page identifier 302, discussed in more detail below, specifies information that is stored and/or collected at a service provider 114. By scrolling to and then selecting a page identifier 302, a request is sent from paging device 108 to service provider 114. For example, paging device 108 transmits a request to cell site 102. The request is then forwarded from cell site 102 to service provider 114 via communications network 110.

B. Request Messages

Figure 5A:
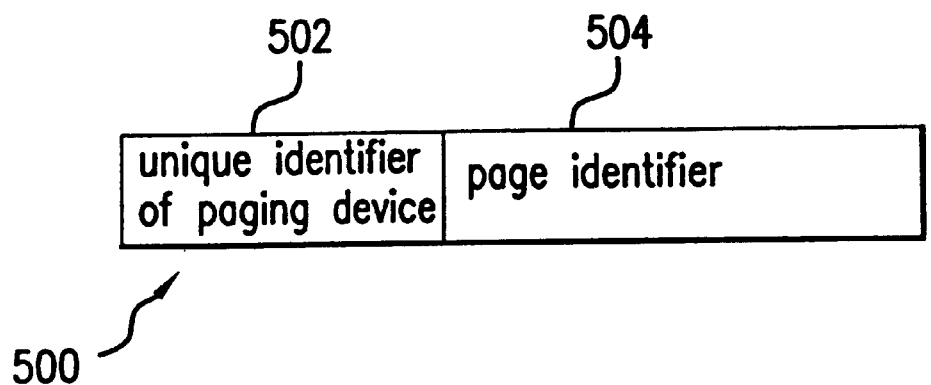
FIGS. 5A and 5B illustrate portions of request messages for use with the present invention.
Figure 5B:
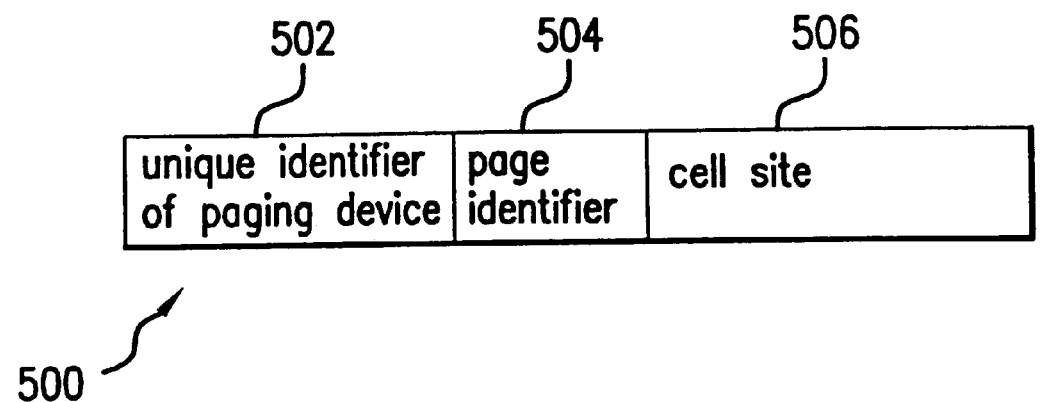

FIG. 5A illustrates and exemplary request messages that is generated by paging device 108. In FIG. 5A, request message 500 includes portions 502 and 504. Portion 502 specifies a unique identifier (for example, a MAN or ESN) of paging device 108. Portion 504 specifies the page identifier 302 that was selected (from portfolio list 300) by a user of paging device 108. In another embodiment, shown in FIG. 5B, the request message 500 also includes portion 506 that specifies a cell site from which request message 500 was sent. The cell site information can be added to the request by the provider of communications system 100. For example, the cell site information can be provided by MSC 120 before the request is forwarded to service provider 114. Additionally, request massage 500 can include server address (not shown) of service provider 114. In a preferred embodiment, this server address is coded into an application running on paging device 108. In this manner, when a user selects a page identifier (associated with service provider 114) the server address is automatically included as part of the request message. Additional details of page identifiers 302 are discussed below.

Cell site information can be maintained in a database of the provider of communications system 100 (such as BellSouth). This database, maintained at MSC 120 for example, can map unique identifiers of paging devices 108 with cell sites 102. MSC 120 can keep track of the whereabouts of each paging device 108 by keeping track of which cell site 102 a message, sent by a paging device 108, originated. Examples of tables that can be stored in such a database are shown in FIGS. 6 and 7. FIG. 6 shows table 600 that includes MAN column 602 and cell site column 604. Alternatively, FIG. 7 shows table 700 that includes cell site column 702 and MANs column 704. For example, row 706 of table 700 indicates that paging devices having $MAN_1$ and $MAN_5$ are within the coverage area of cell site 1. This cell site information can be added to a request message 500 before MSC forwards the message to service provider 114. Alternatively, service provider 114 can determine which cell site's coverage area paging device 108 is within by requesting such cell site information from MSC 120 via communications network 110.

C. Page Identifiers

Figure 4:
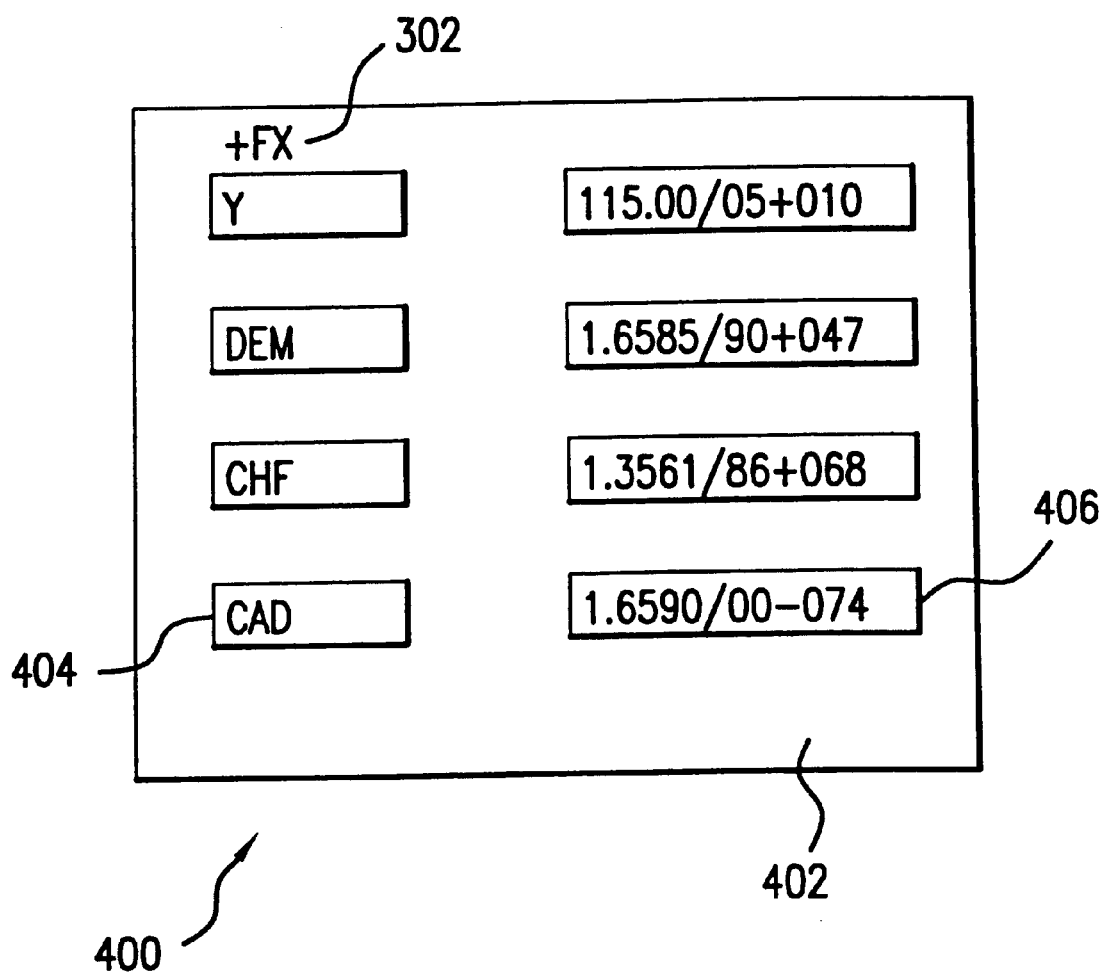
FIG. 4 shows a formatted page as it is presented on a display screen of a paging device, according to an embodiment of the present invention.

Each page identifier 302 specifies information that is stored and/or collected at a service provider 114. In one embodiment, service provider 114 stores a plurality of templates, wherein each template corresponds to a page identifier. Each of these templates includes at least one information field. For example, the template and information field(s) corresponding to the +FX page identifier will be described. +FX is actually a brief identifier that stands for "foreign exchange." The template corresponding to +FX shall be referred to herein as the +FX template. For example, the +FX template shown in FIG. 4 includes information fields 406. Each information field can have a corresponding information field identifier 404. Examples of information field identifiers are Y and CAD, which stand for "Yen" and "Canadian Dollar", respectively. Once a request message specifying +FX is received, service provider 114 determines real-time data for each information field 404. For example, for information field identifier CAD, the data provided for its corresponding information field can relate to the exchange rate of the Canadian Dollar. A "completed" template shall be referred to herein as a formatted page 400. What is meant by "completed" is that data has been determined for each information field 406 of the template 402. In a preferred embodiment, service provider 114 determines the real-time data by obtaining it from external data sources 132, which are discussed in more detail below. Additional details of formatted pages 400 are also discussed below.

It is noted that terms such as formatted page, template and information field refer to information that the service provider 114 determines in response to the request. As noted herein, the service provider 114 either looks-up pre-stored information or queries a database for real-time information. Thus, the formatted page, template or information field are data structures that are propagated or otherwise linked or field delimited (possibly via software by the service provider) with the resultant information. This enables specific resultant information to be quickly sent by the service provider 114 as pages, field delimited text, or the like, to the requesting paging device (i.e., subscriber) and displayed by a paging device 108. Transmitted resultant information for a given information field need not be limited to the amount of information that can be displayed on the paging device's display. The paging device's operating system only needs to be able to determine what should displayed first, so that the subscriber can later scroll to view the additional data.

In a preferred embodiment, each page identifier 302 includes a predetermined symbol (for example, an ASCII character) that identifies a string of alphanumeric characters as being a page identifier. For example, each page identifier 302 can begin with a "+" symbol. Accordingly, the existence of the "+" symbol in "+FX" identifies this string as a page identifier. Of course the use of other symbols/characters is within the scope of the present invention. The advantage of each page identifier 302 having such a predetermined symbol is that it enables a message specifying a page identifier to be distinguished from other types of messages that can be sent using paging device 108. For example, if a subscriber wants to receive a single quote, such as the current price of a share of Apple Computer, Inc. stock, the subscriber can enter the four character symbol "APPL" on the paging device and then press send. The absence of the "+" symbol indicates that a formatted page is not requested. In response to receiving a request message that does not include a page identifier, service provider 114 can send back a message, for example, that simply includes a single current stock price.

D. Formatted Pages

As briefly discussed above, FIG. 4 shows an example of a formatted page 400 corresponding to page identifier +FX. Formatted page 400 includes information field identifiers 404 (shown in a first column) and corresponding information fields 406 (shown in a second column). The values within the information fields are U.S. exchange rates. For example, the value 115.00/05+010 corresponding to Y, should be interpreted as the exchange rate being 115.00/05 Japanese Yen per 1 U.S. Dollar. The number following "+" or "−" symbols represent a positive (+) or negative (−) change in value for the entire most recent trading day. Other formatting schemes are envisions, which do not depart from the spirit and scope of the present invention.

Upon receipt of a request message from paging device 108, service provider 114, using a processor (not shown), examines the request. Assuming the request message specifies a page identifier, service provider 114 determines the page identifier specified by the request message. Service provider 114 can also determine an identity of paging device 108 using the unique identifier specified in the request. In a preferred embodiment, service provider 114 determines an identity of paging device 108 based on a Mobile Access Number (MAN), discussed above. If the request includes information specifying a cell site from which paging device 108 sent the request, then service provider 114 can also determined the cell site of paging device 108. Alternatively, service provider 114 can determine the cell site of the paging device 108 by requesting such information from a database of MSC 120, as discussed above.

Assuming a request message specifies page identifier +FX, service provider 114 determines information relating to +FX. In a preferred embodiment, service provider 114 retrieves a +FX template (from a plurality of stored templates) that includes information fields 406, discussed above. Service provider 114 can then obtains real-time data from one or more data sources 132. These data sources 132 maintain real-time databases 130 that contain information relating to finance, sports, weather, airline schedules, and the like. Examples of data sources 132 include Reuters, which is a well known leading financial and news provider, and GovPX, which provides Treasury market pricing. A data source that maintains foreign exchange information is Garvin Information Systems, LLC, of New York, N.Y., who provides real-time data feeds for spot foreign exchange rates, spot cross rates, currency forward rates, and the like.

Service provider 114 obtains this real-time data to complete a template 402 (corresponding to the page identifier) and thereby creates a formatted page 400. The formatted page 400 can then be sent to the paging device 108 that sent the request message. In a preferred embodiment, the response message is transmitted to only a targetted coverage area, as described above. The response message can be re-transmitted until service provider 114 and/or MSC 120 receive an acknowledgment message from paging device 108 indicating that paging device 108 has received the formatted page 400.

E. Personalized Formatted Pages

In one embodiment of the present invention, subscribers can create custom or personalized formatted pages. For example, in FIG. 3 the "+TONY1" page identifier shown in portfolio list 300 can correspond to a personalized formatted page. A personalized formatted page can correspond to a unique identifier of a paging device 108 such that the formatted page corresponding to "+TONY1" can be different for a first paging device 108A than it is for a second paging device 108B. In other words, formatted pages corresponding to the same page identifier can be different for different paging devices 108. This is because service provider 114 can maintain a database that maps page identifiers to unique identifiers and templates 402. An example of a table maintained in such a database is shown in FIG. 8.

FIG. 8 illustrates a table 800 that includes a page identifier column 802, a MAN column 804, and a template column 806. Some page identifiers 302, such as +FX and +FUTURES, can correspond to the same template for all MANs. Accordingly, when service provider 114 receives a request message specifying +FX, from a first paging device 108A (having unique identifier $MAN_4$) and a second paging device 108B (having unique identifier $MAN_8$), the response message sent to the first and second paging devices 108A, 108B will cause the same formatted page to be displayed. However, when service provider 114 receives a request message specifying page identifier +TONY1 from the same two paging devices, 108A and 108B, the response message sent to the first paging device 108A will be different than the response message sent to the second paging device 108B, thereby causing a different formatted page to be displayed on the first paging device 108A as compared to that displayed on the second paging device 108B. This is because the same page identifier, +TONY1, can correspond to different templates depending on the MAN of the paging device that sent the request. The different templates can have different information fields. For example, Template+TONY1(4) can have information fields that relate to the prices of precious metals, while Template+TONY1(8) can have information fields that relate to airline schedules, sports scores, and headline news. Accordingly, by maintaining a database having tables similar to table 800, service provider 114 can efficiently and cost effectively provide information that is specific to each subscriber.

Additionally, a page identifier, such as +GROUP, can correspond to one template (Template+Group(A)) for one group of paging devices (having unique identifiers $MAN_4$, $MAN_8$, $MAN_{12}$ and $MAN_{33}$) and correspond to a second template (Template+Group(B)) for a second group of paging devices (having unique identifiers $MAN_7$, $MAN_{22}$, $MAN_1$, and $MAN_{50}$). A group, for example, can include employees of the same company or some other plurality of subscribers having similar interests (e.g., shift schedules for groups of teams).

A subscriber can call service provider 114 and specify what information fields 406 the subscriber (also referred to herein as a user of paging device 108) wants in the templates corresponding to a personalized formatted page. Alternatively, service provider 114 can maintain a web page from which a subscriber can customize the template of his personalized formatted page. It is also anticipated that a message sent from paging device 108 to service provider 114 can provide the necessary information for service provider 114 to generate a template for a personalized formatted page. A user of paging device 108 can add (or delete) page identifiers 302, such as those corresponding to personalized formatted pages, to (or from) portfolio list 300.

Service providers operating over one-way paging systems cannot provide such efficient and cost effective customized service because they would need to broadcast the personalized pages within the coverage area of every cell site. Additionally, service providers using one-way paging systems would not know when a subscriber wanted this personalized information and thus would need to periodically broadcast these personalized pages thereby wasting channel capacity and increasing the airtime used to send the personalized pages.

F. Verifying Authorization

In a preferred embodiment, service provider 114 can determine whether paging device 108 is authorized to receive a response that includes information relating to the page identifier. For example, service provider 114 can utilize a database, that maps unique identifiers (i.e., MIN, ESN, MAN) with page identifiers, to determine whether paging device 108 is authorized to receive information relating to the page identifier specified in the request. In a preferred embodiment, service provider 114 maintains a database that maps MANs and page identifiers. After receiving a request message, if service provider 114 determines that paging device 108 is authorized to receive information relating to the page identifier, then service provider 114 determines the information relating to the page identifier in order to prepare a response message. If it is determined that paging device 108 is not authorized to receive the information relating to the page identifier, service provider 114 can send a message to paging device 108 indicating the unauthorized status or service provider 114 need not respond to the request.

An important advantage of using the unique identifier of paging device 108 to determine authorization is that the procedure of "logging in" is avoided. Typically, a user must log into a system before it can request proprietary information. This may require entering a user name, password, and the like. Such a login process is time consuming. Additionally, a logging procedure can consume expensive airtime when performed over a wireless two-way communications system. That is, a logging procedure typically necessitates multiple messages being sent between a service provider 114 and paging device 108 before authorization is determined. If a two-way paging subscriber's fee is dependent on the number of messages and/or the number of characters sent and/or received, a logging procedure increases the subscribers' bills. Additionally, a logging procedure can consume valuable channel capacity.

G. User Interface

In a preferred embodiment, where paging device 108 is the RIM pager discussed above, functions corresponding to the pressing of specific buttons on the pager can be modified. Normally, a user of the RIM pager must navigate out of one state to get to another state. For example, if a user is currently viewing a message sent from another paging device, the user must navigate out of the message and then navigate to the portfolio list before the user can select a page identifier. In a preferred embodiment, a user can press a predetermined button to jump directly to the portfolio list screen regardless of what was being presented on display 210. For example, pressing button 216 can cause portfolio list 300 to be immediately displayed. If more than one portfolio list 300 is stored in the RIM pager, a next portfolio list can be displayed by pressing button 216 a second time. To make button 216 a "portfolio button," a custom application can be developed for the paging device operating system using, for example, C++.

A custom application can also be developed to cause a "Symbol Entry" screen to be displayed when a predetermined button is pressed. Screen 900 of FIG. 9 is an example of such a screen. Pressing button 218 can cause screen 900 to be immediately displayed. A user can the enter a page identifier or other type of request using keypad 212. For example, a user can type "+FX" and then press thumb wheel 214 in order to send a request message specifying +FX to service provider 114. Alternatively, a user can press button 218, type "APPL," and then press thumb wheel 214 in order to request the current stock price of Apple Computer, Incorporated. To make button 218 a "Symbol Entry button," a custom application can be developed for the paging device operating system using, for example, C++.

H. Description of Flow Diagram

The method according to the present invention provides information to uniquely identifiable two-way wireless communications devices. Below is a high level flow diagram that illustrates the method of the present invention in a wireless communications system including a plurality of cell sites. Each cell site has a corresponding coverage area, as described above.

Figure 10:
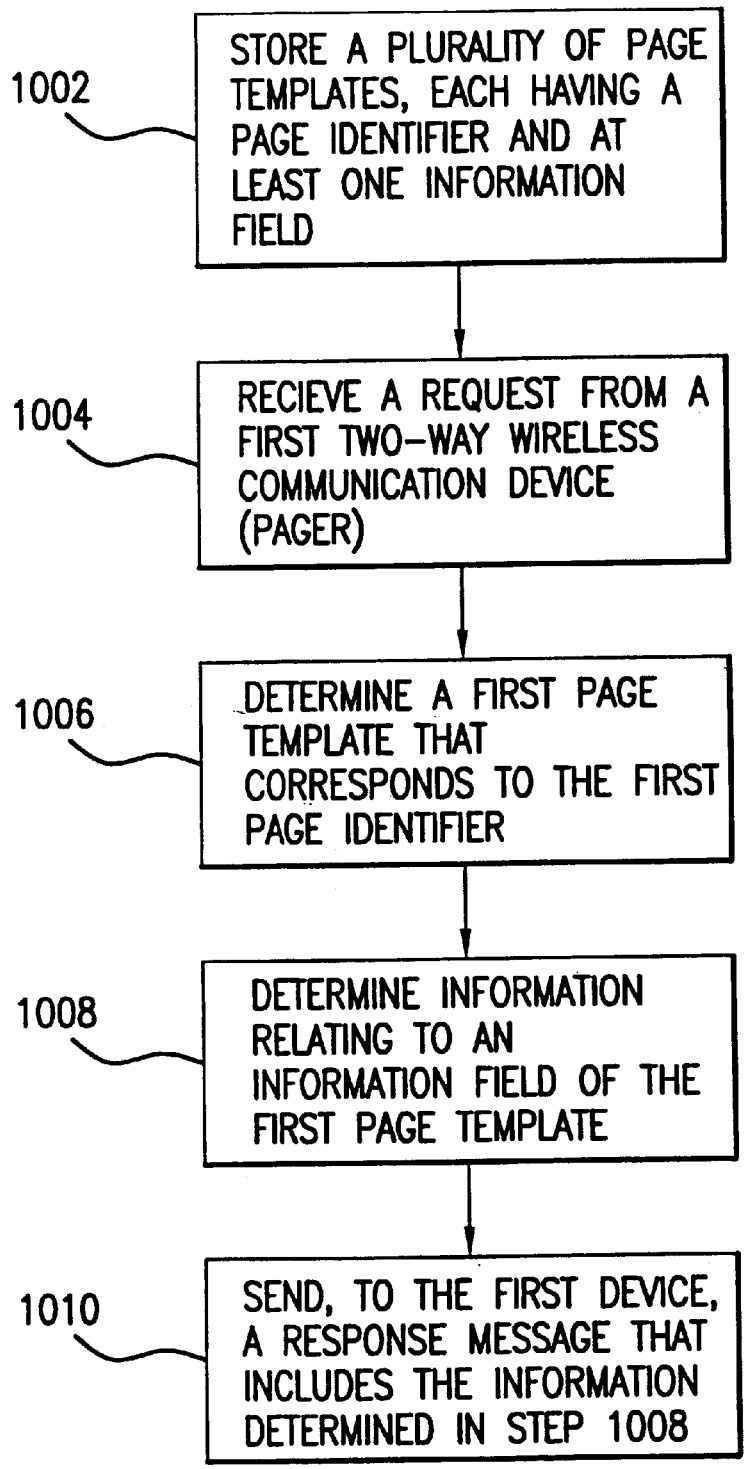
FIG. 10 is a flowchart depicting the high level operation of the present invention.

Turning to FIG. 10, the method of the invention includes storing a plurality of page templates, wherein each page template has a corresponding page identifier and at least one information field, as shown in step 1002. In one embodiment, each page template also corresponds to a two-way wireless communications device, such that two page templates can be different if they correspond to the same page identifier but correspond to different devices.

In step 1004, a request is received from a first two-way wireless communications device (two-way pager). The request specifies the first device and a first page identifier that was selected by a user of the first device.

Based on the first page identifier specified in the request, a first page template is determined, as shown in step 1006. In the embodiment where each template also corresponds to a two-way wireless communications device, the first page template is determined based on the first page identifier and the first device, both of which are specified in the request.

The service provider then determines an item of information for each of the information fields of the first page template, as shown in step 1008. An information field can correspond to, for example, the real-time exchange rate of Japanese currency, final results of a sporting event, current weather conditions, and the like. The item of information that is determined for each of the information fields is the actual data that the service provider collects, looks-up, or otherwise accesses. For example, if an information field corresponds to the real-time exchange rate of Japanese currency, the information that is determined is "115.00/05+010", for example. If the information field corresponds to the current weather conditions, the information that is determined is "52 degrees, barometer rising, light showers", for example. Because the service provider can determine the cell site from which the first device sent the request (as discussed above), the determined information can also correspond to a location of that cell site. For example, the determined current whether conditions can be specific to the location of the cell site from which the device sent the request. The service provider can collect such information from external data sources, as discussed above.

Once the service provider has determined the information in step 1008, the service provider then sends a response message to the first device, as shown in step 1010. This response message includes the information that was determined in step 1008. Once received at the first device, the information can be displayed on the first device's display.

V. Conclusion

There are many advantage of the present invention. For example, a formatted page 400 can include information specifically requested by a single subscriber. In contrast, one-way paging systems typically provide a subscriber with much more information than the subscriber wants. This is because the information that is broadcast in a one-way paging system must appeal to a broad spectrum of subscribers. Accordingly, when a subscriber receives more information than desired, he/she must parse through the information until the desired information is found.

Another advantage of the present invention is that it conserves channel capacity for at least the following reasons. The present invention only sends messages in response to a request or a triggering event. Conventional one way service providers must periodically send messages because they do not know when a subscriber wants information. Also, in a preferred embodiment the response messages are transmitted only within a targetted coverage area. In contrast, conventional one-way service providers typically must transmit messages to the coverage areas of every cell site, regardless of the location of paging devices, thereby wasting valuable channel capacity.

Service provider 114 can perform specific features of the present invention using service provider controllers, which in effect comprise a computer system. Such a computer system includes, for example, one or more processors that are connected to a communication bus. Although telecommunication-specific hardware can be used to implement the present invention, the following description of a general purpose computer system is provided for completeness.

The computer system can also include a main memory, preferably a random access memory (RAM), and can also include a secondary memory. The secondary memory can include, for example, a hard disk drive and/or a removable storage drive, representing a floppy disk drive, a magnetic tape drive, an optical disk drive, and the like. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCM-CIA slot and card, etc. Software and data transferred via the communications interface are in the form of signals that can be electronic, electromagnetic, optical or other signals capable of being received by the communications interface. These signals are provided to communications interface via a channel that can be implemented using wire or cable, fiber optics, a phone line, a cellular phone link, an RF link, and the like.

In this document, the terms "computer program medium" and "computer usable medium" are used to generally refer to media such as removable storage device, a hard disk installed in a hard disk drive, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable the processor to perform features of the present invention. Accordingly, such computer programs represent controllers of the computer system.

In an embodiment where the invention is implemented using software, the software can be stored in a computer program product and loaded into the computer system using the removable storage drive, the hard drive or the communications interface. The control logic (software), when executed by the processor, causes the processor to perform certain functions of the invention as described herein.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

In yet another embodiment, features of the invention can be implemented using a combination of both hardware and software.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. In a wireless communications system including a plurality of cell sites, a method for providing formatted information, to uniquely identifiable two-way wireless communications devices, using minimal airtime, the method comprising the steps of:

(a) storing a plurality of non-hierarchal page templates each having a page identifier and at least two information fields;

(b) receiving a request from a first two-way wireless communications device, the request specifying the first device and a first page identifier selected by a user of the first device;

(c) determining a first page template of the plurality of page templates that corresponds to the first page identifier, the first page template including a first information field and a corresponding first information field identifier, and a second information field and a corresponding second information field identifier;

(d) determining first information relating to the first information field by retrieving the first information from a first data source, and second information relating to the second information field by retrieving the second information from a second data source that is distinct from the first data source; and (e) sending a formatted page to the first device, the formatted page including the first information determined in step(d) and the corresponding first information field identifier, and the second information determined in step(d) and the corresponding second information field identifier.

2. The method of claim 1, further comprising the step of displaying the information on a display of the first device.

3. The method of claim 1, further comprising the step of displaying a portfolio list, from which the user can select a page identifier, on the first device, the portfolio list including at least the first page identifier.

4. The method of claim 3, further comprising the step of displaying the portfolio list in response to a portfolio key of the first device being pressed, regardless of what was displayed on the first paging device prior to the portfolio key being pressed.

5. The method of claim 1, wherein each of the plurality of templates stored in step (a) also corresponds to a two-way wireless communications device and wherein said step (c) comprises determining a first page template corresponding to both the first page identifier and the first device, wherein a further page template corresponding to the first page identifier and a second device is different than the first page template, said further page template including a third information field and a corresponding third information field identifier, and a fourth information field and a corresponding fourth information field identifier.

6. The method of claim 1, wherein said step (d) further comprises determining further information relating a further information field of the first page template.

7. The method of claim 1, wherein said step (d) comprises retrieving the information from an external data source.

8. The method of claim 1, wherein said request specifies a brief page identifier corresponding to the first page identifier to thereby reduce airtime used when sending the request from the first device to a receiver of a cell site.

9. The method of claim 1, wherein said step (e) comprises:

(I) determining a first cell site, of the plurality of cell sites, from which the first device sent the request; and (ii) transmitting the response message to the first device via the first cell site.

10. The method of claim 1, further comprising the step of determining whether the first device is authorized to receive the information.

11. The method of claim 9, wherein said step (e) is only performed if the first paging device is authorized to receive the information.

12. The method of claim 1, further comprising the step of displaying a symbol entry screen in response to a symbol key of the first device being pressed, regardless of what was displayed on the first device prior to the symbol key being pressed.

13. The method of claim 1, wherein step (b) further comprises receiving the request via an X.25 network.

14. A system for providing formatted information to two-way wireless communications devices via a wireless communications system having a plurality of cell sites, the system comprising:

a database that stores a plurality of non-hierarchal page templates each having a page identifier and at least two information fields;

a first service provider controller adapted to retrieve a first page template from said database in response to receiving a request from a two-way wireless communications device, wherein said first page template corresponds to a first page identifier specified in said request, said first page template includes a first information field and a corresponding first information field identifier, and a second information field and a corresponding second information field identifier;

a second service provider controller adapted to determine first information relating to said first information field by retrieving said first information from a first data source, and second information relating to the second information field by retrieving said second information from a second data source that is distinct from said first data source; and a third service provider controller adapted to send, to said device, a formated page including said first information and said corresponding first information field identifier, and said second information and said corresponding second information field identifier.

15. The system of claim 14, wherein said response message causes said information to be displayed on said devise.

16. The system of claim 14, wherein said request is generated by a user of said devise selecting said first page identifier from a portfolio list displayed on said device.

17. The system of claim 14, wherein each of said plurality of templates stored in said database also corresponds to a two-way wireless communications device such that said first page template that corresponds to said first page identifier and said device is different than a second page template that corresponds to said first page identifier and a different two-way wireless communications device, said second page template including a third information field and a corresponding third information field identifier, and a fourth information field and a corresponding fourth information field identifier.

18. The system of claim 14, wherein said second service provider controller is adapted to determine further information relating a further information field of said first page template.

19. The system of claim 14, wherein said second service provider controller is adapted retrieve said information from an external data source.

20. The system of claim 14, wherein said request specifies a brief page identifier that corresponds to said first page identifier to thereby reduce airtime used to send said request from said device to a receiver of a cell site.

21. The system of claim 14, further comprising a fourth service provider controller adapted to determine whether said first device is authorized to receive said information.

22. The system of claim 21, wherein said third service provider controller sends said response message only if said device is authorized to receive said information.

23. In a wireless communications system including a plurality of cell sites, a system for providing formatted information, to uniquely identifiable two-way wireless communications devices, using minimal airtime, the system comprising:

means for storing a plurality of non-hierarchal page templates each having a page identifier and at least two information fields; means for receiving a request from a first two-way wireless communications device, said request specifying said first device and a first page identifier selected by a user of said first device, said first page template including a first information field and a corresponding first information field identifier, and a second information field and a corresponding second information field identifier;

means for determining a first page template of the plurality of page templates that corresponds to said first page identifier;

means for determining first information relating to said first information field by retrieving the first information from a first data source, and second information relating to said second information field by retrieving said second information from a second data source that is distinct from said first data source; and means for sending a formatted page to said first device, said formatted page including said first information and said corresponding first information field identifier, and said second information and said corresponding second information field identifier.

* * * * *